United States Patent [19]
Perfect

[11] B 3,982,924
[45] Sept. 28, 1976

[54] PROCESS FOR PRODUCING CARBIDE ADDITION AGENTS

[75] Inventor: Frederick H. Perfect, Wyomissing, Pa.

[73] Assignee: Reading Alloys, Inc., Robesonia, Pa.

[22] Filed: Aug. 6, 1973

[21] Appl. No.: 385,631

[44] Published under the second Trial Voluntary Protest Program on January 27, 1976 as document No. B 385,631.

Related U.S. Application Data

[62] Division of Ser. No. 147,018, May 26, 1971.

[52] U.S. Cl............... 75/.5 BA; 423/414; 75/129
[51] Int. Cl.² ....... B22F 9/00; C21C 7/00; C22B 47/00; C22C 1/04
[58] Field of Search ............ 423/414; 75/200, 203, 75/.5 BA, .5 BB, 129

[56] References Cited
UNITED STATES PATENTS

| | | |
|---|---|---|
| 1,947,206 | 2/1934 | Kelley..................................... 75/1 |
| 2,686,117 | 8/1954 | Wulff..................................... 75/203 |
| 3,013,875 | 12/1961 | Triffleman............................ 75/203 |
| 3,334,992 | 8/1967 | Downing et al........................ 75/.5 |
| 3,488,291 | 1/1970 | Haroy et al...................... 252/301.1 |
| 3,504,093 | 3/1970 | Persson................................... 13/26 |

OTHER PUBLICATIONS

Reiffenstein et al., "Monatshefte Fur Chemie," vol. 96, No. 5, pp. 1543–1546, (1965).
Schwarzkopf et al., "Refractory Hard Metals," 1953, pp. 187–197.

Primary Examiner—Oscar R. Vertiz
Assistant Examiner—Eugene T. Wheelock
Attorney, Agent, or Firm—Howson and Howson

[57] ABSTRACT

Carbide addition agents comprising (a) from about 20 to about 60 atomic percent of carbon, (b) from about 25 to about 60 atomic percent of at least one metal selected from the group consisting of vanadium and columbium, and (c) from about 10 to about 40 atomic percent of at least one metal selected from the group consisting of iron and manganese, are useful alloy addition agents for steel.

6 Claims, 1 Drawing Figure

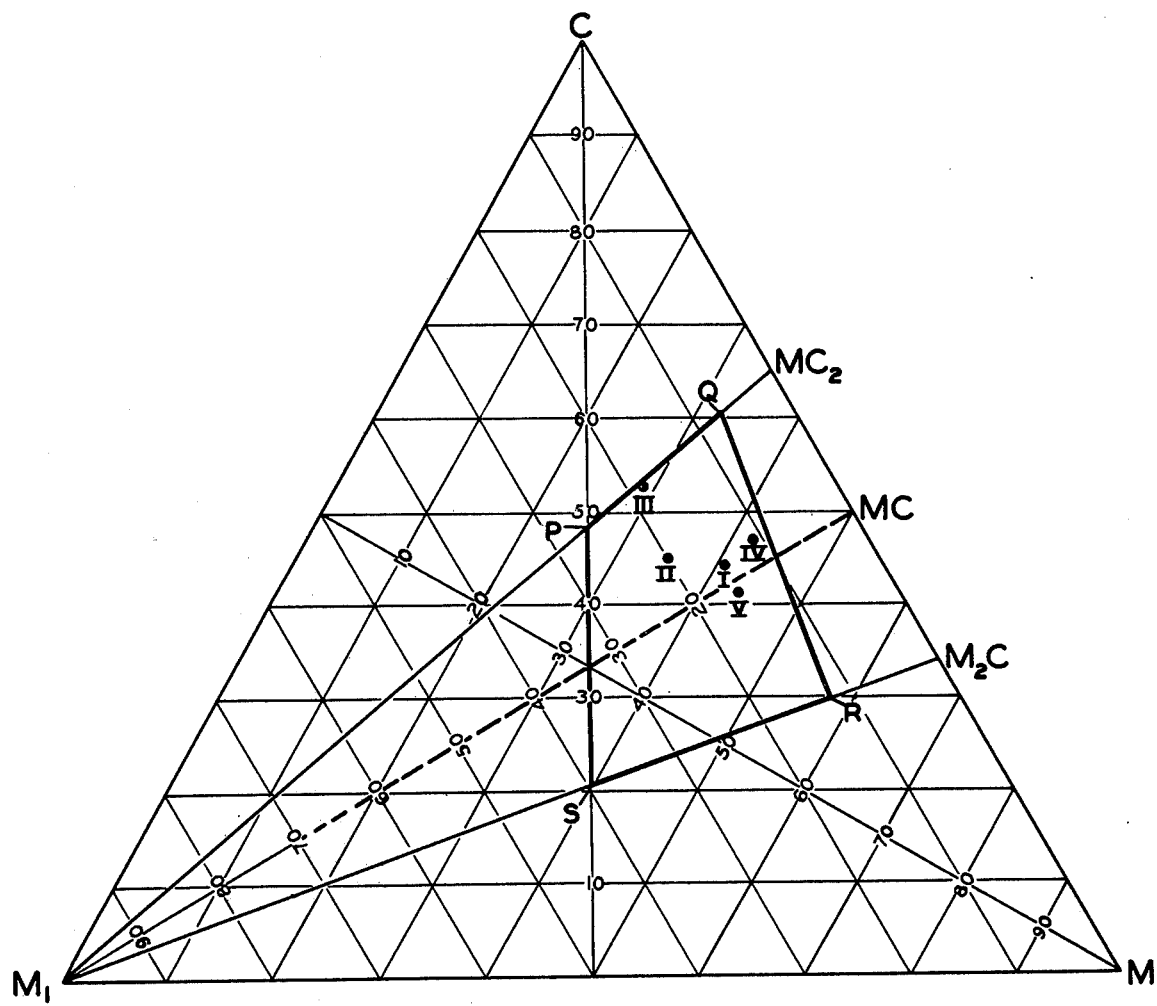

PROCESS FOR PRODUCING CARBIDE ADDITION AGENTS

This is a divisional of application Ser. No. 147,018 filed May 26, 1971.

BACKGROUND OF THE INVENTION

The steel industry has a substantial and growing need for addition agents for producing high strength steel alloys. Various metal carbides have been utilized for this purpose in the past. For example, U.S. Pat. No. 3,334,992 describes the vanadium containing addition agents $V_2C$ and VC and a method for their preparation which involves reduction of vanadium trioxide with carbon at high temperatures under a vacuum. This patent also describes a process in which small amounts of iron powder may be blended with the vanadium trioxide prior to the reduction to increase the strength and reduce the oxygen and nitrogen content of the vanadium carbide addition agent. U.S. Pat. No. 3,342,553 describes a multistage process in which a vanadium carbide addition agent is prepared by sequentially reducing vanadium pentoxide to tetroxide and then to a vanadium oxycarbide. The vanadium oxycarbide is then further reduced with carbon in a vacuum furnace to produce the desired vanadium carbide. Both processes are undesirable since the vanadium carbide agents must be prepared under vacuum conditions which are difficult and expensive to maintain in large scale production. U.S. Pat. No. 3,504,093 describes a columnar furnace designed for the continuous production of metal carbide products in which agglomerates of carbon and a metal oxide such as vanadium oxide are heated to a temperature between 1500° and 1900°C. to produce the metal carbide and then immediately cooled in a cooling zone of the furnace to a temperature of about 400°C.

It is an object of this invention to prepare carbide addition agents in a relatively simple manner which does not require the use of vacuum conditions but which provides addition agents of excellent quality.

It is a further object of this invention to prepare carbide addition agents which readily combine with molten iron and steel to produce high strength alloys.

DESCRIPTION OF THE INVENTION

The carbide addition agents of this invention include those compositions comprising (a) from about 20 to about 60 atomic percent of carbon, (b) from about 25 to about 60 atomic percent of at least one metal selected from the group consisting of vanadium and columbium, and (c) from about 10 to about 40 atomic percent of at least one metal selected from the group consisting of iron and manganese, the proportional relationship between $a$, $b$, and $c$ being such that a point representing the composition of carbide addition agent lies substantially within the area PQRS set forth in FIG. 1.

FIG. 1 shows the relationship of the various elements which comprise the composition of this invention. In the compositional relationship of the figure, $M_1$ represents one or more of the metals of iron or manganese; M represents one or more of the metals of vanadium or columbium, or combinations thereof; and C represents carbon. When M, $M_1$ and C are hereinafter mentioned, it is intended that these symbols refer to the aforementioned description of elements that they represent. Carbide addition agents having a composition falling within the area PQRS of FIG. 1 are prepared by combining finely-divided carbon (C), an oxide of the metal $M_1$ and an oxide or combination of oxides of the metal M to form a uniform mixture, compacting the mixture, and sintering said compact mass at a temperature of from about 1200° to 1400°C. under a reducing atmosphere and ambient pressure to reduce the oxides of the metal M and the oxide of the metal $M_1$ to produce the desired carbide.

In preparing the carbide addition agents of this invention, the carbon source utilized may be any commercially available form of carbon such as asphaltic emulsion and like products, lampblack, graphite, anthracite coal and coke. Lampblack is preferred due to its fine particle size. The carbonaceous material should be reduced to at least 200 mesh, by down, prior to mixing with the other components of the ternary carbide agent. Reduction of the carbon, as well as of the other components of the carbide agent, to the desired particle size can be accomplished in any convenient manner such as by ball milling.

The oxides of the metal $M_1$ utilized in preparing the carbide may be finely-divided iron oxide such as FeO, $Fe_2O_3$ or $Fe_3O_4$ or finely-divided manganese oxide such as MnO, $Mn_3O_4$ and $MnO_2$. The iron or manganese oxide should be reduced in particle size to at least 200 mesh by down prior to combining it with the carbon and oxide of the metal M.

The third component utilized in preparation of the carbide addition agents of this invention is an oxide of the metals vanadium or columbium (metal M). A commercially available oxide of one of these metals, after reduction in particle size to at least 200 mesh, by down, is combined with the iron oxide and carbon. Suitable commercially available forms of vanadium oxide include vanadium pentoxide ($V_2O_5$), commonly known as "redcake," containing about 87% $V_2O_5$. Vanadium pentoxides containing at least about 98% $V_2O_5$ are also available and can be readily used; vanadium sesquioxide, $V_2O_3$, may also be utilized.

Suitable oxides of columbium include commercial grade $Cb_2O_5$, usually 99% pure. Ores such as pyrochlore containing about 50% $Cb_2O_5$ and Columbite, a ferrous-manganous-columbate ore containing about 70% $Cb_2O_5$ may also be utilized. Since the ores are not concentrated sources of the columbium oxide, relatively larger amounts of the ores must be utilized to provide the desired amount of columbium oxide.

Another source of the vanadium and columbium oxides is the residue obtained when rutile ($TiO_2$) is utilized to obtain titanium tetrachloride. The residues obtained from titanium tetrachloride production are generally rich in both vanadium pentoxide and columbium pentoxide containing respectively about 16 and about 12 percent, by weight, based on the weight of the residue of these oxides. When titanium tetrachloride residue is utilized as a source of metal oxides in this invention, the product obtained is actually a mixture of carbides such as iron vanadium carbide and iron columbium carbide, since both the vanadium oxide and columbium oxide content of the titanium tetrachloride residue are reduced in the carbide forming process.

Since the various metals (M and $M_1$) which make up the carbide additions agents may, and generally do, vary in purity, the proportions thereof required to provide carbide addition agents of a given composition will vary accordingly. In addition, during the sintering operation employed in forming the carbide agent, a portion of the carbon reactant reacts with the oxygen in the oxides of the metals M and $M_1$. Thus, a sufficient amount of carbon must be present to obtain the reduction of the metal oxides as well as to form the desired carbides.

For these reasons, in this description and appended claims, the respective amounts of M, $M_1$ and C utilized in preparing the carbide addition agents are expressed in terms of the composition of the desired carbide addition agent. Again, referring to the FIGURE of the drawing, M, $M_1$ and C are combined in proportions so as to provide a carbide having a composition, in terms of atomic percent, falling within the area PQRS of FIG. 1. It will be noted from a consideration of FIG. 1 that the carbide addition agents having a composition falling within the area PQRS contain from about 10 to about 40 atomic percent $M_1$, from about 25 to about 60 atomic percent M, and from about 20 to about 60 atomic percent C. Also, as seen by reference to FIG. 1, the atomic ratio of C to M in the carbide addition agents does not exceed about 2:1 ($MC_2$) and preferably 1:1 (MC), for it has been found that formulations producing carbide addition agents in the form $MC_2$ and greater carbon contents yield, after sintering, products having a large amount of soot and excessive porosity. In addition, formulations having a $M_1$ to M atomic ratio greater than 1:1 ($M_2M$) have a tendency to fuse during the sintering operation thereby limiting their usefulness as addition agents. Those carbides having a final ratio of C to M below about 1:3 are also not desirable since they have very poor strength after sintering and generally have large amounts of oxygen. Preferably, the atomic ratio of C to M is not less than 1:2 ($M_2C$).

In preparing the desired carbide addition agents, the carbon, oxide of the metal $M_1$, and oxide or combinations of oxides of the metal M are each reduced to the desired particle size, combined so as to form a substantially uniform mixture, and then compacted, as for example, with simple mechanical pressure, pelletizing or agglomeration. Pelletizing is accomplished in conventional pelletizing equipment forming pellets one-half to one inch in diameter. The compacting can be carried out in any suitable apparatus such as briquetting machine through the application of pressures on the order or 7000 psi or more. When pressures on the order of 7000 psi are utilized, the resultant compacted mass generally has a density of from about 2 to about 3 grams/cc; it is of course, possible to increase the density of the compacted mass by increasing the pressure applied during the compacting procedure. The compacts can be made in any desired shape and size. Preferably, from about 50 to about 500 grams of a mixture of carbon, oxide of the metal $M_1$, and oxide of the metal M are compacted to form a cylindrical or spherical shape having a diameter in the range of about ¼ to about 1 inch and a length of about ¼ to about 1 inch. Other suitable forms include briquettes of a rectangular cross section and hockey puck shapes about one-half to one inch thick and about two to four inches in circumference.

The compacted mixture of carbon and oxides of the metals M and $M_1$ is then sintered in any convenient furnace, such as a brick kiln or rotary kiln furnace, at a temperature of from about 1200° to about 1400° C. in a reducing atmosphere. At these temperatures, no fusion of the material occurs and as the heating progresses, the oxides are reduced with the liberation of carbon monoxide. The sintering operation preferably is carried out in a reducing atmosphere until complete, generally requiring from about 2 to about 3 hours. No special pressure conditions are required for the sintering operation.

It is believed that by reason of the large amounts of iron or manganese contained in the compacted mass utilized in preparing the carbide addition agents (at least 10 atomic percent), reduction of the columbium or vanadium oxides to form the corresponding carbide takes place without the necessity of requiring vacuum conditions. Further, it is believed that the presence of relatively large amounts of iron or manganese enhances the formation of the ternary metal carbide while at the same time reducing the oxygen and nitrogen content of the resultant product.

During the sintering operation, the compacted mixture shrinks in size with a corresponding weight reduction. This shrinkage is beneficial since it enhances the density of the carbide product. After sintering, the carbide addition agents generally have a density of from about 3.5 to about 5 grams/cc.

After sintering, the carbide is cooled in the furnace or auxillary cooler, under the reducing atmosphere until the carbide addition agent reaches a temperature of about 400° C. when it may be removed to cool to ambient temperatures in air.

The resultant metal carbide addition agents contain carbides of the metals vanadium or columbium, or a combination of vanadium and columbium, in sufficient quantities to be a practical and convenient source of the carbide material in the preparation of high strength steel alloys. In preparing a high strength, low alloy steel employing a carbide addition agent of this invention, the agent is simply added to molten iron or steel where it dissolves readily and rapidly (usually in less than a minute). The metal carbides have sufficient density so that upon their addition to molten iron and steel they immediately sink to the steel-slag interface where they readily dissolve, rapidly forming desired high strength, low alloy steels. Metal carbides of this invention provide a very efficient means of forming high strength iron or steel alloys with vanadium or columbium, since, as a general rule, it had been found that more than 80% of the vanadium or columbium present in the metal carbide addition agent is incorporated into the final steel alloy.

This invention is further illustrated by the following examples:

EXAMPLE 1

Ferrovanadium carbide

One thousand grams of a mixture containing 34.4%, by weight, of $Fe_2O_3$, 39.6%, by weight, of $V_2O_5$, and 26%, by weight, of carbon (lampblack) are blended, deagglomerated and mechanically pressed into pellets about two inches long and one inch in diameter under a pressure of 7000 psig. The $Fe_2O_3$ and $V_2O_5$ are reduced to a particle size of −200 mesh prior to mixing with the carbon. The compacted pellets, which have a density of 2.9 grams/cc, are loaded into a clay graphite crucible and covered with a graphite lid and sealed with a layer of crushed coal. The loaded crucible is placed in an induction furnace and the pellets are sintered at 1200° C. for a period of two hours. The pellets are cooled in the furnace to 400° C., removed from the furnace, and cooled to ambient temperature. The sintered pellets exhibited a change in weight of 46 percent and a linear shrinkage of 15 percent. The sintered pellets had a chemical analysis of 22.4% iron, 59.2% vanadium, 14.7% carbon, and 0.93% oxygen and a density of 3.9 gm/cc. The composition, expressed in terms of atomic percent, is 14.4% iron, 41.6% vanadium, and 44% carbon and is denoted in FIG. 1 as Roman I. 16.3 grams of the sintered pellets (containing 9.2 gms. of vanadium) are added to 2000 gms. of molten electrolytic iron (containing less than 0.01% vanadium) at 1550° C. Prior to addition of the sintered pellets, the molten iron was inoculated with 2 percent, by weight, aluminum as an oxygen scavenger. The resultant inoculated and alloyed iron analyzed 0.47% vanadium, indicating a vanadium recovery of 97 percent.

EXAMPLE 2

Ferrocolumbium carbide

One thousand grams of a mixture containing 17.7% $Fe_2O_3$ (−200 mesh), 59.5% $Cb_2O_5$ (−200 mesh), and 22.7% carbon (lampblack) are blended, deagglomerated and mechanically pressed at 7000 psig. into pellets about two inches long and one inch in diameter. These pellets, which have a density of 2.6 grams/cc, are loaded into a clay graphite crucible covered with a graphite lid and sealed with a layer of crushed coal and sintered in an induction furnace at 1300° C. for a period of two hours. The pellets are cooled in the furnace to about 400° C., removed from the furnace, and cooled to ambient temperature. The sintered pellets exhibited a change in weight of 40.1%, indicating a reduction efficiency of 98 percent, and a linear shrinkage of 30%. The sintered pellets have a chemical analysis after sintering of 21.2% Fe, 66.5% Cb, 10.5% carbon, and 0.54% oxygen, with a density of 3.7 gm/cc. The composition, expressed in terms of atomic percent, is 19.1% iron, 35% columbium, and 45% carbon and is denoted as Roman II in FIG. 1. A sample of the sintered pellets weighing 10.5 grams (7.0 gms of Cb) was added to 2000 grams of molten electrolytic iron with a non-detectable level of columbium, at 1550° C. Prior to addition of the sintered pellets, the molten iron was innoculated with 2 percent, by weight, aluminum as an oxygen scavenger. The resultant inoculated and alloyed iron analyzed 0.34% Cb, indicating a 97.5% transfer efficiency.

EXAMPLE 3

Ferrocolumbium carbide

One thousand grams of a mixture of 11.25% FeO (−200 mesh), 74.4% pyrochlore (CbO content of about 51% −200 mesh), and 14.5% carbon (lampblack) are blended, deagglomerated and mechanically pressed at 7000 psig into pellets one inch in diameter by two inches long. The pellets, which have a density of 2.8 grams/cc, are loaded into a clay graphite crucible covered with a firebrick lid and inserted into an induction furnace and sintered at 1300° C. for a two hour period. The pellets are cooled in the furnace to about 400° C., removed from the furnace, and cooled to ambient temperature. The sintered pellets exhibited a change in weight of 29.1% and a linear shrinkage of 15 percent. The pellets analyzed 36.5% columbium, 13.8% iron, 8.5% carbon, the balance being CaO, $Al_2O_3$ and $SiO_2$ and exhibited a density of 5.0 grams/cc. The composition, expressed in terms of atomic percent, is 18% iron, 29.3% columbium, and 53.3% carbon, and is denoted as Roman III in FIG. 1. A sample of the sintered pellets weighing 48.7 grams (17.7 grams of columbium) was added to 2000 grams of molten electrolytic iron having a nondetectable columbium level and heated to 1550° C. Prior to addition of the sintered pellets, the molten iron was innoculated with 2%, by weight, aluminum as an oxygen scavenger. The inoculated and alloyed iron analyzed 0.7% Cb, indicating a transfer efficiency of 79 percent.

EXAMPLE 4

Manganese vanadium carbide

One thousand grams of a mixture containing 12.2 percent, by weight, of $MnO_2$, 60.5%, by weight, of $V_2O_5$, and 27.7%, by weight, of carbon (lampblack) are blended, deagglomerated, and mechanically pressed into pellets about three inches in diameter under a pressure of 7000 psig. The $MnO_2$ and $V_2O_5$ are reduced to a particle size of −200 mesh prior to mixing with the carbon. The compacted pellets, which have a density of 2.8 grams/cc, are loaded into a clay graphite crucible and covered with a graphite lid and sealed with a layer of crushed coal. The loaded crucible is placed in an induction furnace and the pellets are sintered at 1300° C. for a period of two hours. The pellets are cooled in the furnace to a temperature of about 400° C., removed from the furnace and cooled to ambient temperature. The sintered pellets exhibited a change in weight of 49.3% and a linear shrinkage of 10%. The sintered pellets had a chemical analysis of 17% manganese, 62% vanadium, 16.2% carbon, and 2.8% oxygen. The composition, expressed in terms of atomic percent, is 10.8% manganese, 42% vanadium, and 47% carbon and is denoted as Roman IV in FIG. 1. Fifteen grams of the sintered pellets (containing 9.3 grams of vanadium) are added to 2000 grams of molten electrolytic iron (containing less than 0.01% vanadium) at 1550° C. Prior to addition of the sintered pellets, the molten iron was inoculated with 2 percent, by weight, aluminum as an oxygen scavenger. The resultant innoculated and alloyed iron analyzed 0.093% Mn and 0.495% vanadium, indicating a vanadium recovery of 100 percent.

EXAMPLE 5

Manganese columbium carbide

One thousand grams of a mixture containing 9.5% by weight of $MnO_2$, 69.0%, by weight, of $Cb_2O_5$, and 21.5%, by weight, of carbon (lampblack) are blended, deagglomerated, and mechanically pressed into pellets about three inches in diameter under a pressure of 7000 psig. The $MnO_2$ and $Cb_2O_5$ are reduced to a particle size of −200 mesh prior to mixing with the carbon. The compacted pellets, which have a density of 2.3 grams/cc, are loaded into a clay graphite crucible and covered with a graphite lid and sealed with a layer of crushed coal. The loaded crucible is placed in an induction furnace and the pellets are sintered at 1300° C. for a period of two hours. The pellets are cooled in the furnace to a temperature of about 400° C., removed from the furnace and cooled to ambient temperature. The sintered pellets exhibited a change in weight of 41.5% and a linear shrinkage of 20 percent. The sintered pellets had a chemical analysis of 14.8% manganese, 69.3% columbium, 8.4% carbon, and 5.35% oxygen and a density of 3.7 gm/cc. The composition, expressed in terms of atomic percent, is 15.6% manganese, 43% columbium and 41% carbon, and is denoted as Roman V in FIG. 1. 14.4 grams of the sintered pellets (containing 10.0 grams of columbium) are added to 2000 grams of molten electrolytic iron (containing less than 0.01% columbium) at 1550° C. Prior to addition of the sintered pellets, the molten iron was inoculated with 2 percent, by weight, aluminum as an oxygen scavenger. The resultant innoculated and alloyed iron analyzed 0.50% columbium, indicating a 100 percent recovery.

EXAMPLE 6

Mixed ferrovanadium and ferrocolumbium carbides

One thousand sixty grams of a mixture of 820 grams of titanium tetrachloride residue containing about 16%, by weight, $V_2O_5$, 12%, by weight, $Cb_2O_5$, and 8.9%, by weight, $Fe_2O_3$, all weights based on the weight of the residue, 100 grams of $Fe_2O_3$ (−200 mesh) and 140 grams of carbon (lampblack) are blended, deagglomerated, and mechanically pressed into pellets 1 inch in diameter at 7000 psig. The pellets, which have a density of 2.3 grams/cc, are sintered at 1300° C. for two hours in a clay graphite crucible covered with a carbon lid and sealed from the atmosphere with a layer of crushed coal. The pellets are cooled in the furnace to about 400° C., removed from the furnace, and cooled to ambient temperature. After sintering it was determined that the pellets exhibited a change in weight of approximately 40% and a diameter shrinkage of 20 percent. The sintered pellets had a metallic luster in their surfaces as well as in their fractured sections. Chemical analysis of the sintered pellets showed 16.49% Fe, 9.94% Cb, 9.33% V, 14.83% $O_2$, 14.07% carbon (total), 8.0% carbon (free), with a balance of unreduceable compounds, i.e. oxides of Si, Zr, Ti, and a density of 3.7 grams/cc. The final composition of the sintered pellets, expressed in terms of atomic percent, is 26.6% metal carbide formers (Cb, V), 27.0% Fe, and 46.4% carbon (combined carbon). This composition corresponds approximately to the compound $FeMC_2$. A sample of sintered pellets weighing 46 gms was added to 2000 grams of molten electrolytic iron (containing less than 0.01% vanadium or columbium). Prior to the addition of the sintered pellets, the molten iron was innoculated with 2%, by weight, of aluminum as an oxygen scavenger. Analysis of the inoculated and alloyed iron was 0.11% Cb and 0.20% vanadium indicating a transfer efficiency of 50% for the columbium and 93% for the vanadium.

What is claimed is:
1. A process for preparing carbide addition agents comprising combining in a finely-divided state
   a. carbon
   b. an oxide of at least one metal selected from the group consisting of vanadium and columbium, and
   c. an oxide of at least one metal selected from the group consisting of iron and manganese into a uniform mixture, compacting said mixture, sintering and reducing said compact mixture at a temperature of from about 1200° to about 1400° C. under a reducing atmosphere, and about atmospheric pressure to form said carbide addition agent the proportional relationship between $a$, $b$, and $c$ being such that a point representing the composition of said carbide addition agent, expressed in atomic percent, lies substantially within the area PQRS of FIG. 1.

2. A process according to claim 1 wherein said oxide of the metal selected from the group consisting of vanadium and columbium is vanadium and said oxide selected from the group consisting of iron and manganese is iron.

3. A process according to claim 1 wherein said oxide of the metal selected from the group consisting of iron and manganese is iron and said oxide selected from the group consisting of vanadium and columbium is columbium.

4. A process according to claim 1 wherein said oxide of the metal selected from the group consisting of iron and manganese is manganese and said oxide of the metal selected from the group consisting of vanadium and columbium is vanadium.

5. A process according to claim 1 wherein said oxide of the metal selected from the group consisting of iron and manganese is manganese and said oxide of the metal selected from the group consisting of vanadium and columbium is columbium.

6. A process according to claim 1 wherein said oxide of the metal selected from the group consisting of vanadium and columbium is a mixture of vanadium and columbium oxides and said metal selected from the group consisting of iron and manganese is iron.

* * * * *